United States Patent [19]
Wienand et al.

[11] 3,937,777
[45] Feb. 10, 1976

[54] PROCESS FOR THE PRODUCTION OF SHEETS OF FOAMED THERMOPLASTICS SYNTHETIC RESINS

[75] Inventors: Michael Wienand, Siegburg; Jürgen Hasberg, Troisdorf-Oberlar; Franz-Werner Alfter, Siegburg, all of Germany

[73] Assignee: Dynamit Nobel AG, Germany

[22] Filed: Nov. 27, 1972

[21] Appl. No.: 309,914

[30] Foreign Application Priority Data
Nov. 26, 1971 Germany............................ 2158673

[52] U.S. Cl. .................. 264/53; 428/74; 428/288; 428/292; 428/98; 264/177 R; 264/235; 264/346; 264/DIG. 5; 264/DIG. 15
[51] Int. Cl............................................ B29d 27/00
[58] Field of Search .......... 264/51, 53, 46, DIG. 15, 264/235, 346, DIG. 5, 177 R; 156/187, 167; 161/140, 168

[56] References Cited
UNITED STATES PATENTS

| | | | |
|---|---|---|---|
| 2,774,991 | 12/1956 | McCurdy | 264/DIG. 15 |
| 3,121,130 | 2/1964 | Wiley et al. | 264/53 |
| 3,121,132 | 2/1964 | Del Bene | 264/53 X |
| 3,126,432 | 3/1964 | Schuur | 264/DIG. 15 |
| 3,227,784 | 1/1966 | Blades et al. | 264/53 |
| 3,241,343 | 3/1966 | Yazawa | 264/235 UX |
| 3,277,221 | 10/1966 | Parrish | 264/53 |
| 3,314,840 | 4/1967 | Lloyd et al. | 156/181 X |
| 3,368,934 | 2/1968 | Vosburgh | 156/181 X |
| 3,374,300 | 3/1968 | Azuma | 264/46 |
| 3,423,266 | 1/1969 | Davies et al. | 156/181 X |
| 3,467,744 | 9/1969 | Woodell | 264/53 X |
| 3,503,907 | 3/1970 | Bonner | 264/53 X |
| 3,551,536 | 12/1970 | Guerreiro | 264/346 X |
| 3,637,458 | 1/1972 | Parrish | 264/53 X |
| 3,696,181 | 10/1972 | Bonner | 264/53 |
| 3,725,320 | 4/1973 | Wang | 264/DIG. 15 |

FOREIGN PATENTS OR APPLICATIONS

| | | | |
|---|---|---|---|
| 1,084,746 | 9/1967 | United Kingdom | 264/53 |

OTHER PUBLICATIONS

Whittington, Lloyd R., "Whittington's Dictionary of Plastics," Stamford, Conn., Technomic, 1968, pp. 7, 13.
"Hackh's Chemical Dictionary," Fourth Edition, Completely Revised and Edited by Julius Grant, New York, McGraw-Hill, 1969, pp. 20, 49 and 665.

*Primary Examiner*—Philip E. Anderson
*Attorney, Agent, or Firm*—Craig & Antonelli

[57] ABSTRACT

A process and apparatus for continuous production of molded sheets of a foamed thermoplastic synthetic resin, wherein a synthetic resin is fed into a screw extruder and a low boiling point liquid expanding agent is introduced under high pressure into the extruder and admixed with the resin in the extruder and thereafter the resulting admixture is extruded in the form of a plurality of foam filaments to insure proper distribution of the admixture to the nozzles of the extruder. A gear pump is provided for each nozzle. Also, to avoid collapsing of the foam means are provided for tempering the foam filaments by the application of heat.

27 Claims, 6 Drawing Figures

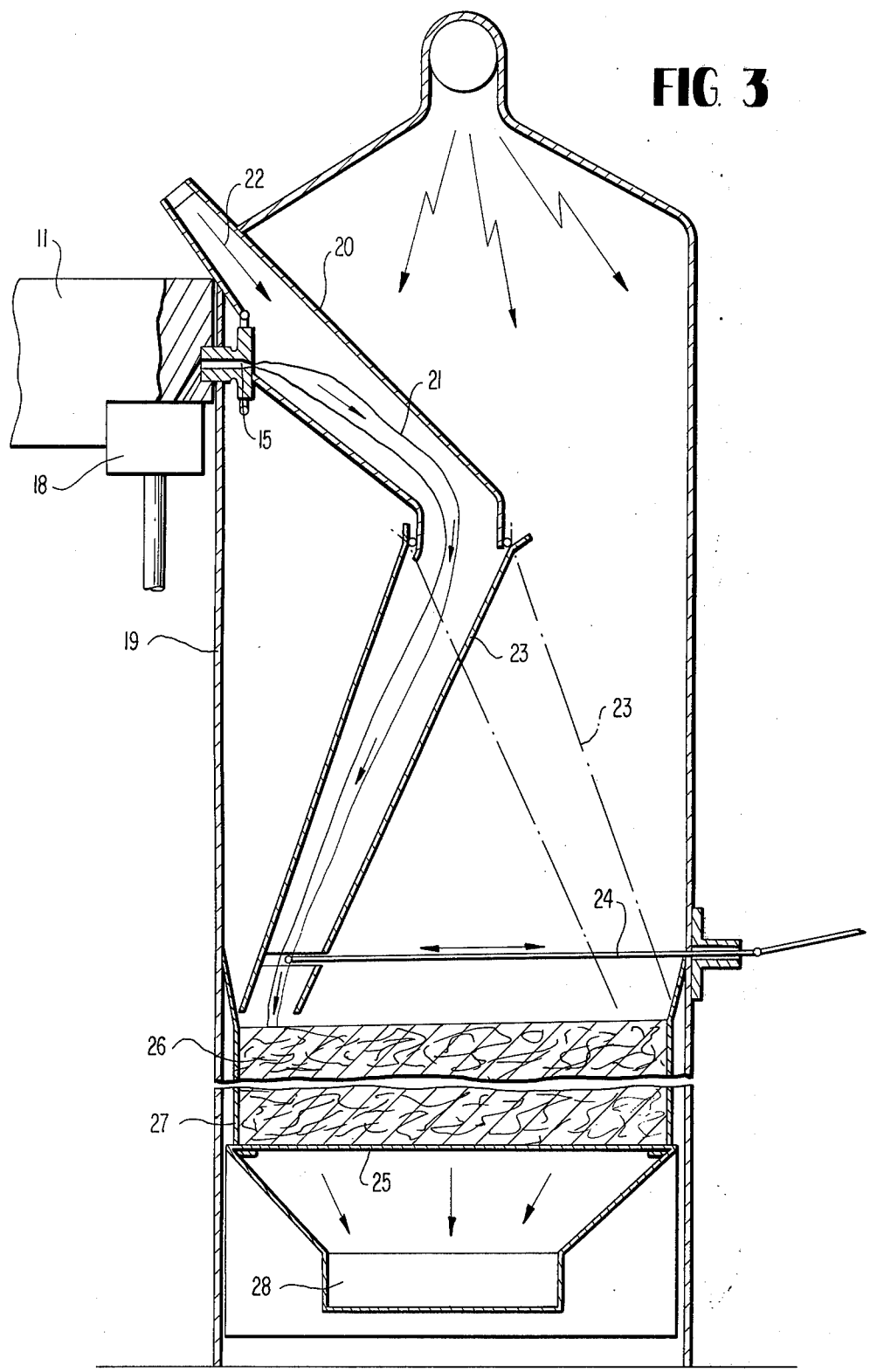

PROCESS FOR THE PRODUCTION OF SHEETS OF FOAMED THERMOPLASTICS SYNTHETIC RESINS

The present invention relates to a process and apparatus for the production of sheets of foamed thermoplastic synthetic resins.

In the production of foam sheets the foaming of the thermoplastic synthetic resins is effected in the thermoplastic condition either by the development of gases or by means of gases previously introduced under pressure. However, it has been found that the foaming effect can also be obtained by bringing the synthetic resin, in the presence of a low-boiling liquid and/or a corresponding liquid mixture, which have a dissolving action on the the synthetic resin at least in the gaseous phase, to a temperature lying essentially above the boiling point of the liquid and/or liquid mixture at normal pressure and simultaneously to a high pressure, while being in a substantially closed container or the like; thereafter, the solution is driven out of the container through a narrow opening and thus is suddenly expanded thereby.

In this process, the largest portion of the solvent can be vaporized, and the foamed material extensively retains its structure during a subsequent cooling step which follows the expansion. The still hot, foamed synthetic resin can then be molded into any desired shaped articles with the use of a moderate pressure, e.g. about 0.1 to 0.5 atmospheres gauge. Thus, it is possible in this manner, for example, to obtain also larger blocks from which plates or panels in any desired thickness can then be cut to size.

It is advisable for conducting the process of the invention to fashion the container as an extruder with a screw (i.e. a screw conveyor) rotatably supported in a heated housing provided with openings for the entrance and discharge of the materials and to feed the synthetic resin and the solvent separately into the extruder; in this connection, the synthetic resin is introduced in the zone of the rear end of the screw, and the solvent is charged in a zone which is located more closely toward the center of the screw.

The size of the discharge opening of the die end for the synthetic resin filaments and the extruder output are adapted to each other in such a manner that the pressure ambient at the front end of the extruder is sufficiently higher than the vapor pressure of the solvent, whereby the objective is attained that the foaming of the solution takes place only after the foamable solution has exited from the discharger opening, rather than taking place in the discharge opening proper or even within the extruder.

It is an object of this invention to improve the conventional process and the associated apparatus for the production of foamed thermoplastic synthetic resin sheets of individual synthetic resin foam filaments, thin ribbons, or the like elongated continuous structures with respect to efficiency and quality.

The process of this invention provides that the foam filaments exiting from the die of the extruder means are aligned by an airstream, current, or jet; are subsequently made to assume an oscillating motion and are loosely layered into a continuous multi-layered web-like mass on a sieve-like conveyor belt moved to be offset by 90° with respect to the oscillating motion of the foam filaments, and are pressed thereon by the pressure of the evacuated airstream, whereafter the layered plastic foam is continuously pressed into a crude sheet and preliminarily tempered (i.e. heated to remove the solvent expanding agent retained therein) between two sieve-like conveyor belts while simultaneously being passed through by hot air, and thereafter the crude sheet is subjected to a finishing tempering step without the use of pressure and then pressed into an endless synthetic resin foam sheet with the use of all-around pressure (i.e. from all sides) while passing through a heating zone and a subsequent cooling zone.

The process of this invention makes it possible to effect a continuous production of synthetic resin foam sheets, panels, or the like, of uniform quality in an uninterrupted fashion from the mixing of the individual components forming the synthetic resin foam to the finished, dimensionally accurate and tempered synthetic resin sheet which is ready for further processing in a correctly sized form.

For conducting the process of this invention, an apparatus is employed with a screw extruder preferably having two separate feed openings disposed one behind the other in the direction of the screw axis for the introduction of the synthetic resin and the readily boiling (i.e. low-boiling) liquid solvent, respectively, and having a nozzle unit or die with several discharge openings arranged in parallel. This apparatus is further characterized in that a pump preferably fashioned as a gear pump is associated with each of the discharge opening of the die and the pump is connected in the mass flow within the die and pumps the foamable extrudate composition to the individual discharger openings. The gear pumps are disposed preferably in the zone between a flow controlling means in the form of a projection for regulating and distributing the foamable feed into the nozzle unit and the discharge openings of the nozzle unit.

The apparatus of this invention eliminates the disadvantage that, for the extrusion of several foam filaments, a separate screw with a subsequent foaming nozzle is required for each foam filament. For example, if it is intended, as in the proposed process, to simultaneously extrude many, e.g. 12,foam filaments, then 12 plasticizing screws are necessary according to the known methods which are fed independently of one another with the required materials (thermoplastic and expanding or blowing agent) in order to be able to produce the foamable solution or gel. It is extraordinarily difficult to adjust all governing variables so that all screws yield the same mixture and thus the same foam filament.

It was found that the assembly of a nozzle unit with several bores in front of a single screw extruder did not yield any appreciable success, either, since here again it is impossible to charge all nozzle bores uniformly; as a result, the individual foam filaments are very different in quality.

Only by the use of the extrusion unit of this invention, wherein the foamable resin solution or gel coming from the screw extruder is pumped to the individual nozzle discharge openings, and all nozzles are fed with the same mixture produced by one screw extruder, it is possible to ensure filaments are equal in quality. Likewise, it is substantially easier to adjust the mixture with respect to thermoplastic, on the one hand, and expanding agent, on the other hand, in an optimum fashion since only one screw extruder is to be charged.

It has proved to be practicable to drive the gear pumps used to meter the foamable material by means of a speed-variable drive, whereby the amount of the solution or gel conveyed by each pump can be exactly dosed or metered and thus the foam filament quality can be set to an optimum.

However, in addition to a uniform distribution of the substance and charging of the nozzle unit, it also proves to be very important to distribute the thus-formed foam material filaments uniformly and pass them on in this manner.

Therefore, it is contemplated in accordance with the invention to surround the discharge openings of the nozzle unit by a device for cooling the exiting foam filaments. An example for a suitable cooling device are annular air nozzles. These cool the filaments to temperatures varying from about 60° to about 90°C. Furthermore, according to a further embodiment of the invention, an air well charged with a heated air stream is connected to the discharge end of the nozzle unit. The filaments of foam material formed in this way after discharge from the nozzle unit prove to be smooth and porous. These foam filaments are guided at the exit of the air well between two vertical distributor plates executing an oscillatory motion. The amplitude and speed of the distributor plates are adjustable. The foam filaments exiting from the individual nozzles of the die are guided between the distributor plates by an air stream and are placed, by the oscillating motions of the plates, in layers onto a sieve-like conveyor belt disposed underneath the plates; the conveying direction of this belt extends in a direction offset by 90° with respect to the motion direction of the distributor plates, and the belt constantly carries the thus-layered foam filaments away in a continuous manner. A draw-off or suction device for the air is arranged underneath the conveyor belt, which device firmly presses the filaments of foam material against the conveyor belt by means of the suction generated by the drawn-off air. This air is recirculated and charged again above the nozzles. Simultaneously, the warm air stream also serves for removing the expanding agent from the foamed synthetic resin. Depending on the degree of enrichment of the expanding agent in the air, a portion of the drawn-off air-blowing agent mixture can be fed to an expanding agent recovery plant. Fresh air must then be introduced correspondingly, preferably in the heated condition.

In order to obtain flawless molded sheets of foam material, the excess expanding agent retained in the filaments must be removed from the foam material. It was found that, after the first layering after leaving the nozzle, the foam filaments still contain so much expanding agent that a sheet, panel, or the like, pressed from these filaments collapses after a short period of time, being subjected to large dimensional changes therein.

This circumstance made it necessary to expose the foamed material to a period of prolonged temperature control or tempering to effect removal of the expanding agent. The tempering step can be conducted in a conventional manner either discontinuously or continuously to thereby stabilize the foam structure.

A continuous tempering operation as utilized according to the present process is advantageous. According to the invention, the provision is made to pass the foamed material, composed into a loose web by layering, through a combined preliminary pressing and preliminary tempering zone. Here, the foamed material is pressed continuously into a crude sheet or strip between sieve-like conveyor belts, the thickness of this sheet still being substantially above the thickness of the finished product (about 3 to 4 times the thickness of the finished below Above and belwo the sieve-like conveyor belts, air nozzles are disposed which blow hot air of preferably 95°–100°C. at a pressure of 200 mm. $H_2O$ column through the crude sheet. The air, enriched with expanding agent, is then drawn off underneath the conveyor belts and, in case of an appropriate expanding agent concentration, fed to an expanding agent recovery plant (not shown). The finishing tempering zone follows the combined preliminary pressing and preliminary tempering zone, the pre-pressed foam band passing through this finishing tempering zone, for example, on corresponding link conveyor belts or chain conveyor belts in several tiers. Here, hot air of 95°–100°C. is likewise blown continuously through the crude sheet of foamed material. The amount of air depends on the amount of expanding agent still present in the foam material. The length of the tempering zone must be sufficient for ensuring a minimum tempering period depending on the thickness of the crude sheet.

The finishing compression zone with the edge-forming device follows the finishing tempering zone. Here, the crude sheet is pressed to an endless sized sheet of foam material between two broad steel strips from the top and from the bottom, as well as two narrow steel bands laterally on the right-hand and left-hand sides. The finishing pressing or compression zone is subdivided into a heating zone and a cooling zone. In the heating zone, starting at the inlet of the pressing zone, the crude sheet is heated to a temperature of 115°–120°C. under a compressive pressure which is not too high, i.e. on the order of from about 0.1 to 0.5 atmospheres gauge. In the subsequent cooling zone, the sheet of foam material is cooled to 40–50°C. likewise under the same compressive pressure used in the heating zone. The foam sheet exits from the finishing pressing zone at this temperature and is passed on to the further processing steps, such as, for example, the manufacture of articles therefrom.

By the subdivision of the apparatus into a combined preliminary pressing and preliminary tempering zone, a subsequent finishing tempering zone, and a subsequent finishing pressing zone with edge-forming device and heating and cooling zones, it is possible by means of the process and associated apparatus of the present invention to produce, temper, and process the synthetic resin foam in a continuous operation.

The invention is illustrated in the drawing in one embodiment and will be explained in greater detail with reference thereto wherein:

FIG. 3 shows a foaming well adjoining the screw extruder;

FIG. 5a is the end view of the device.

Figure 1:
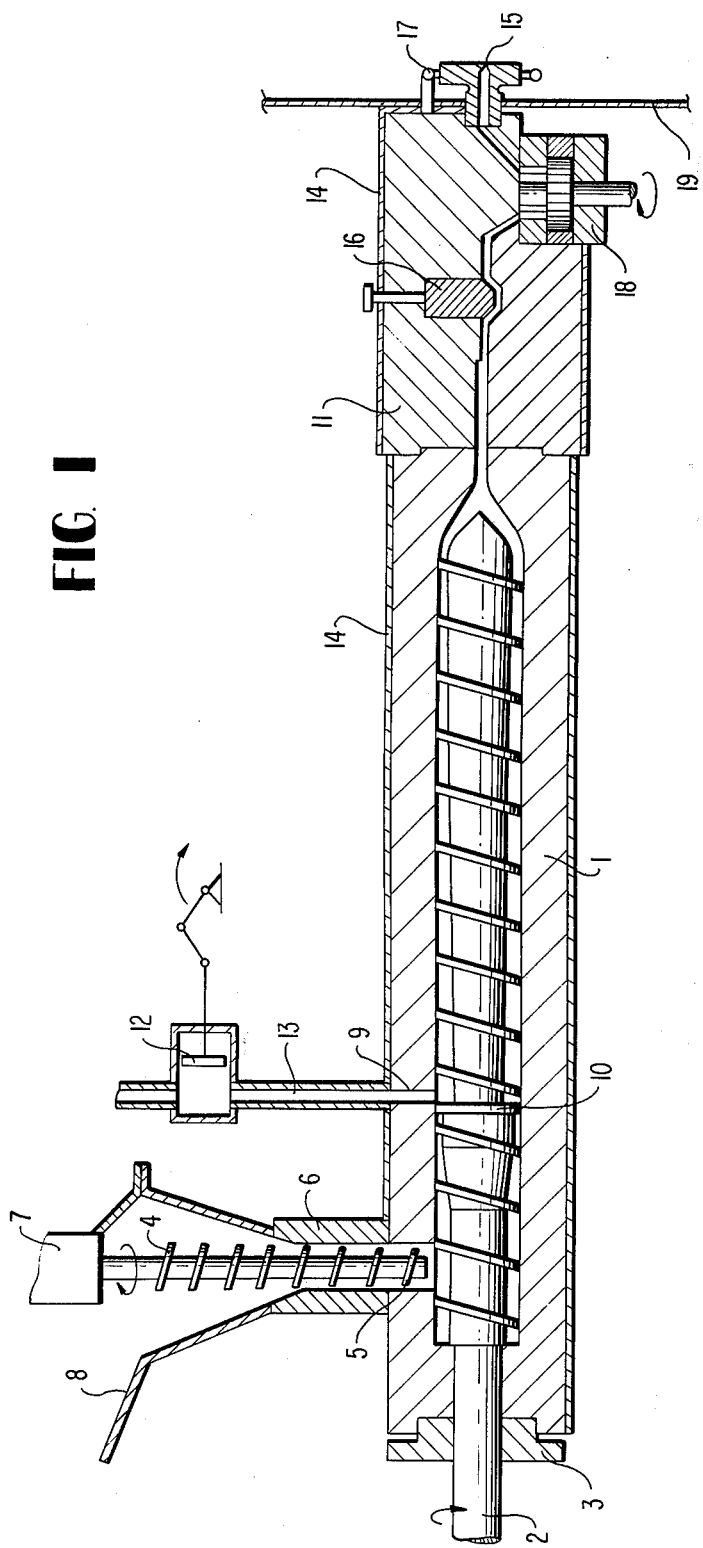
FIG. 1 shows a screw extruder for the extrusion of the filaments of foam material in accordance with this invention.

The extruder shown in FIG. 1 has a rotatably supported screw 2 in the screw barrel 1; the screw is sealed at its rear end by the stuffing box 3. The feeding well 6 is disposed above the feed opening 5; the thermoplastic synthetic resin material, e.g. PVC, is fed to the screw 2 under pressure through the feeding well by the filling screw 4. The filling screw is driven via the drive means 7. The thermoplastic material is introduced into the filling well 6 via the feeding hopper 8. In the screw extruder 1, the thermoplastic synthetic resinous material is first compressed and plasticized by supplying heat thereto. Between the feed opening 5 for the synthetic resin and the feed opening 9 for a liquid solvent expanding agent, the screw 2 is equipped with the brake ring 10. The brake ring 10 serves to prevent the expanding agent fed on one side from passing back to the other side located toward the rear end of the screw and perhaps exiting at the rear. The liquid expanding agent is added via the metering pump 12 and the pressure line 13 under a pressure of preferably 20–50 atmospheres gauge; in this connection, the pressure employed is dependent, in particular, on the properties of the thermoplastic synthetic resinous material.

The expanding agent must be present in the liquid phase prior to exiting of the resin-solvent solution from the screw extruder, since otherwise the foaming process begins undesirably, in the screw extruder. The pressure required for this purpose depends on the temperature of the solution and the vapor pressure curve of the respective expanding agent. Thus, for example, the pressure for methylene chloride at a temperature of 160°C. must be at least about 20 atmospheres gauge, so that the methylene chloride is in the liquid phase. Preferably, the expanding agent is introduced under this pressure into the screw extruder.

In the front portion of the screw 2, the various components forming the extrudate are intimately mixed, and the foamable admixture or solution is fed to the die or nozzle unit 11. In order to obtain a smooth, for example round, strand of material from the die, it is important that the conveying efficiency of the screw be larger than the output speed attainable by the gas pressure, so that the foaming of the admixture (e.g. a gel) or solution does not take place already within the die or even within the screw barrel. The foaming of the extruded filament is terminated approximately 30–40 mm. behind the outlet of each nozzle. The velocity then is about 3–4 m./sec.

Suitable synthetic resins for processing into foam materials are especially PVC (i.e. polyvinyl chloride), polystyrene, and polyethylene, but other synthetic resins such as polyurethanes can also be employed.

It will be understood that the process of this invention was developed specifically for foaming hard PVC, which is a thermoplastic synthetic resin that is in practice difficult to expand while other resins, as heretofore described, can also be employed. In general, conventional foaming procedures may be employed for most of these other thermoplastic synthetic resins, but such procedures are not equally effective for foaming of PVC. Suitable liquid solvent expanding agents are, inter alia, acetone, methylene chloride, and monofluorotrichloromethane; optionally also mixtures of methylene chloride with benzene or acetone, and many others.

Suitable blowing or expanding agents for this invention in the liquid phase are generally those boiling, at normal atmospheric pressure, below about 100°C. and capable of dissolving the thermoplastic resins to be foamed at least at still higher temperatures under pressure. In connection with polyvinyl chloride, acetone, for example, is very well suitable; this solvent has merely a swelling effect at room temperature, but a good dissolving action at 150°C. Methylene chloride exhibits a similar behavior. Also, acetone with water may be used. For polystyrene, methylene chloride is likewise suggested, often in a mixture with benzene or acetone; and for cellulose acetate, acetone, often together with ethyl acetate. The most favorable dissolving temperatures for the resins are about 150–300°C., preferably up to about 200°C., wherein the pressures are to be above 15 atmospheres gauge, preferably between about 20 and 50 atmospheres gauge. The amount of expanding agents introduced into thermoplastic resin is dependent on the desired density of the foam as well as the foaming condition used. Addition of the expanding agent in an amount varying from about 35 to about 45% by volume of the solution is generally found to be particularly effective.

Operation of the apparatus of FIG. 1 will be further understood from the following example: The screw extruder 1 can be charged with the following substances as follows:

EXAMPLE 1

Polyvinyl chloride powder having a K-value (which represents the viscosity) of 68 is fed to the screw extruder 1 at a rate of 500 grams per minute, via the feed opening 5 after the addition of 2% by weight of lead stearate as the stabilizer and 1% of lubricant or mold release agent, i.e. lead sulfate. Methylene chloride is introduced via the feed opening 9 at a rate of 225 grams per minute and the materials are continuously mixed intimately in the screw extruder heated to 160°C. For heating purposes, the screw barrel 1 of the extruder is equipped with the heating unit 14 having resistance elements surrounding the barrel. By means of the screw, the thus-formed PVC solution, being under a methyl chloride vapor pressure of about 30 atmospheres gauge, is ejected from the nozzles of the die at a high speed of about 3–4 m./sec. and a rate of 725 grams per minute and suddenly expanded during this process. The foaming procedure is terminated approximately at a distance of 30–40 mm. from exit end from the die. During this step, no stringy or fragmented product is obtained, but rather a smooth, finely porous filament having 6–10 times the diameter of the die opening, i.e. one millimeter, the specific gravity of this product being about 0.02 g/cm$^3$.

Figure 2:
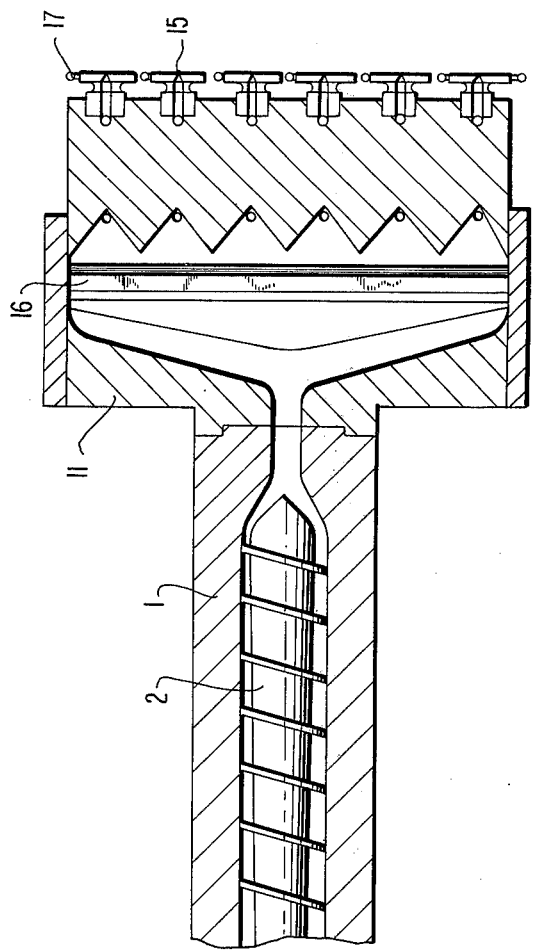
FIG. 2 shows a cross section of a die or nozzle unit of the screw extruder of FIG. 1.

It is apparent from FIGS. 1 and 2 that for the simultaneous extrusion of several foam filaments from a screw extruder, the die 11 is equipped on the exit end with, for example, 12 nozzles 15. Between the adjustable flow control means or projection 16 on the entrance side of the die 11 and the nozzles 15, respectively one gear pump 18 is associated with each nozzle 15. These pumps pump the expandable mixture or solution coming from the screw extruder to the individual nozzles 15.

It proved to be advantageous to drive the gear pumps 18 by means of a speed-variable drive, not shown in detail, whereby the amount conveyed by each gear pump 18 can be accurately metered and thus the quality of the filament of foam material can be optimally set. Since all nozzles are charged with the same mixture produced in one screw extruder, all twelve foam filaments are identical to one another in quality. Also, it is substantially easier to adjust the mixture between the thermoplastic employed and the expanding agent in an optimum manner, since only one screw extruder is to be charged.

The nozzles 15 are surrounded on the exit side with annular air nozzles 17 serving for cooling thereof. In FIG. 2, a schematic cross-sectional view of the nozzle unit 11 is illustrated, showing particularly the configuration of the flow cross section from the nozzle inlet to the individual bores of the nozzles 15 on the outlet side. The gear pumps are not shown, since they are disposed underneath the section plane.

The foam material filaments 21 exiting from the nozzles 15 enter the foaming well 19 as illustrated in FIG. 3. The filaments 21 of foam material are guided into the air well 20 by the heated air stream 22. At the end of the air well 20, the oscillating vertical distributor plates 23 are attached. The oscillating motion of the distributor plates 23 can be effected, for example, by the push rod 24 via a crank drive. The oscillating distributor plates 23 deposit the foam filaments in layers on the sieve-like conveyor belt 25, the conveying direction of which extends offset by 90° with respect to the moving direction of the distributor plates; this belt continuously discharges the thus-layered foam material 26. As lateral boundaries for the layers of foam filaments, the plates 27 are provided. The amplitude of oscillating and the velocity of the distributor plates are adjustable.

The height of depositing the filaments of foam material on the conveyor belt in the air-well can be adjusted as desired. This height is dependent on the thickness and the weight per unit of volume of the sheet of foam material to be produced. Preferably, a depositing height of about 40–400 mm. is maintained.

The draw-off unit 28 for the circulated air is disposed underneath the conveyor belt 25, the foam filaments being firmly pressed against the conveyor belt by means of the drawn-off air stream. The thus-removed air is recirculated and again introduced into the air well 20 above the nozzles 15. The heated air simultaneously serves for the removal of the expanding agent from the filaments of foam material, and this operation depends on the degree of enrichment, i.e. depending on the concentration of expanding agent in the air, a portion of the drawn-off air is fed to an expanding agent recovery plant. Correspondingly, a portion of heated fresh air must then be replenished. After the layering of the foam filaments in the bottom of the foaming well 19 and after leaving the well on the conveyor belt 25, the foam filaments still contain such a quantity of expanding agent that a sheet pressed from these filaments collapses after a short period of time, while being subjected to large dimensional changes. For this reason, a continuous tempering or stabilization zone is connected to the foaming well 19.

Figure 4:
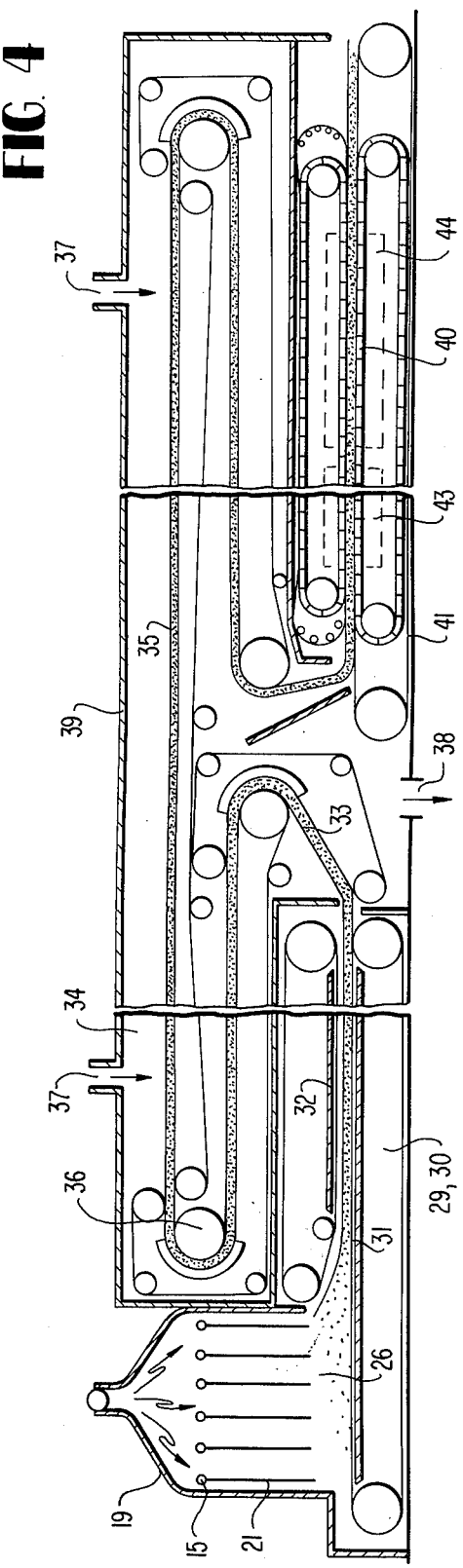
FIG. 4 shows a preliminary pressing and tempering device and a finishing pressing device.

The foam material 26 layered in the foaming well 19 passes, after leaving the foaming well, through the combined preliminary pressing and preliminary tempering zone 29, 30 shown in FIG. 4. Here, the foamed product is continuously pressed into a crude sheet 33 between the sieve-like conveyor belts 31, 32; the thickness of this crude sheet lies substantially above the finished thickness (i.e. about 3–4 times the thickness of the finished product). Above and below the sieve-like conveyor belts, air nozzles are arranged, not illustrated in detail, which blow hot air of preferably 95–100°C. through the crude sheet under a pressure of 200 mm. $H_2O$ column. The air, enriched with expanding agent, is drawn off at the bottom and, in case of an appropriate expanding agent concentration, fed to an expanding agent recovery plant. The finishing tempering zone 34 follows the combined preliminary pressing and preliminary tempering zone 29, 30; the pre-pressed foam strip 33 passes through this finishing tempering zone in several tiers on corresponding link or chain conveyor belts 35. At the ends of zone 34 guide rolls 36 are provided. Here, hot air of 95°–100°C. is likewise continuously blown through the crude sheet of foam material. The amount of air fed thereto is dependent on the amount of expanding agent still present in the crude foam sheet. The tempering zone must be dimensioned in its size so that a minimum tempering time is observed, which is dependent on the thickness of the crude sheet. The fresh air is fed at 37 and drawn off at 38 from the housing 39 surrounding the tempering zone.

The finishing pressing zone 40 with the edge-forming means follows the finishing tempering zone 34. Here, the crude sheet 33 (FIG. 5) is press-molded into an endless, sized foam material sheet by pressure rollers 46 between two broad steel bands 41 at the top and at the bottom, as well as two narrow steel bands 42 laterally on the right-hand and left-hand sides. The finishing pressing zone is subdivided into a heating zone 43 and a cooling zone 44. In the heating zone 43, starting with the inlet of the pressing zone 40, the crude sheet is heated to a temperature of 115°–120°C. under the compressive pressure of, preferably, 0.2 kg./cm².

During the pressing operation, the filaments are no longer melted but rather are pressed into an endless web under the desired pressure, e.g. 0.2 atmosphere gauge. During this operation, the hollow spaces between the individual filaments in the web are reduced, while the cross section of the filaments is only slightly diminished.

In the subsequent cooling zone 44, the foamed sheet is cooled to 40°–50°C., likewise under the same compressive pressure. At this temperature, the finished foam sheet 45 leaves the finishing pressing zone and is passed on to further processing, e.g. manufacture into articles.

The process of this invention will be further understood from the following additional examples.

EXAMPLE II

Figure 5:
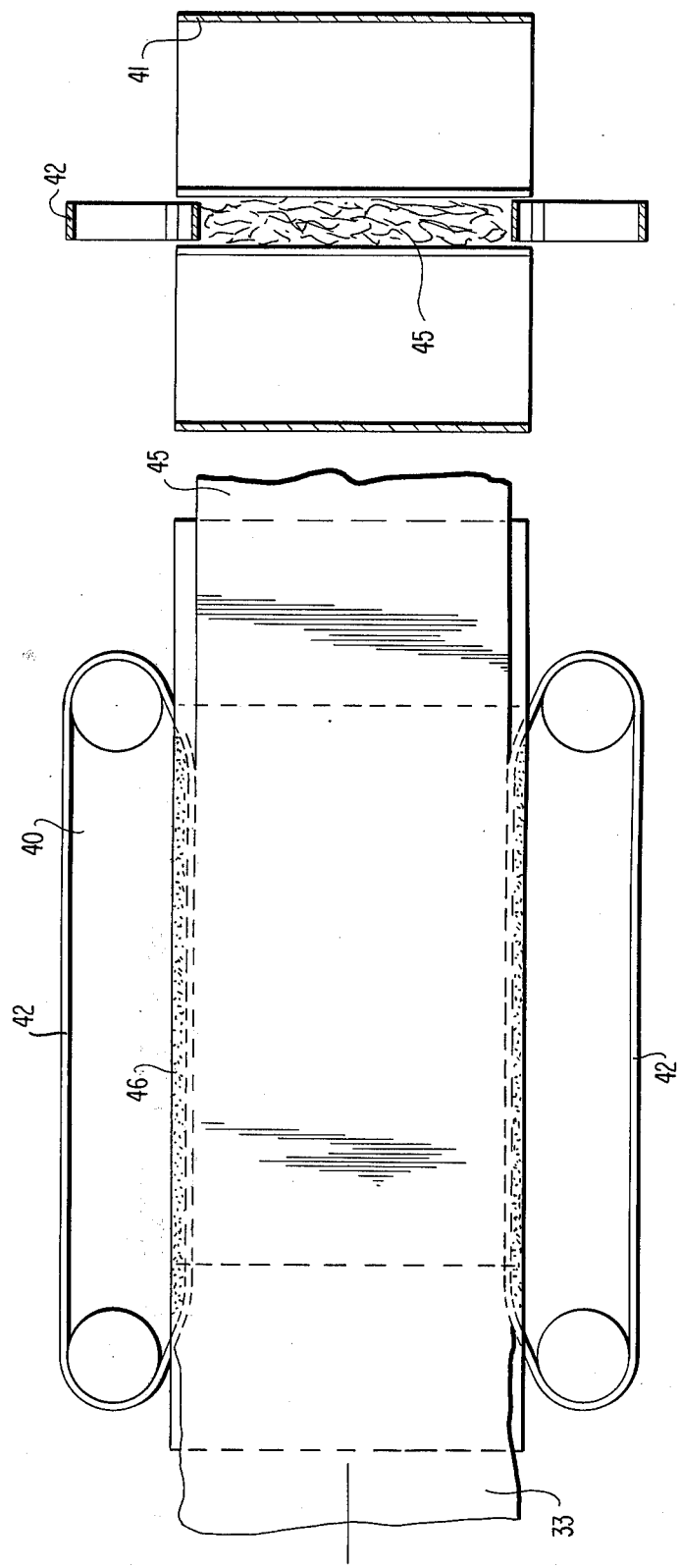
FIG. 5 shows a plan view of the finishing pressing device in greater detail.

The 12 of the filaments obtained from the apparatus shown in FIGS. 1 and 2 and prepared as set forth in Example I are subsequently formed into a multi-layered web in a foaming well, the filaments being initially guided through an air well by air heated to 80°C. and then oscillated back and forth over a conveyor belt sieve, each being extruded at a rate of about 60 grams per minute. The web formed having a thickness of about 250 mm. and a width of about 500 mm. is then continuously passed to a preliminary pressing and preliminary tempering zone wherein the web is pressed under a pressure of about 0.05 atmosphere gauge between two conveyor belt sieves into a crude sheet having a thickness of about 100 mm., hot air at 95°–100°C. being simultaneously directed through the sheet at a pressure of 200 mm. $H_2O$ column. The air containing from 0.6 to 1.0% by volume of methylene chloride is drawn off and sent to a solvent recovering unit. Then the pre-pressed foamed PVC sheet passes for a period of about 50 minutes through a finishing tempering zone wherein hot air at 95°–100°C. under pressure of 150 mm. $H_2O$ column and a rate of 10,000 M³ per hr. is blown through the sheet. Finally, the crude sheet is sent to the finishing pressing zone wherein the sheet is compressed on all four sides as shown in FIGS. 5 and 5a and is initially heated to 115° to 120°C. under a compressive pressure of 0.2 kg./cm². Then the sheet is cooled while under this pressure to a temperature range of from 40°–50°C. The sheet is under this compression for a period of about 15 minutes. The resultant foam sheet has a density of 0.03 grams/cm³ and a methylene chloride content of less than 10% by weight.

EXAMPLE III

Using the procedures outlined in Examples I and II other foam sheets are prepared from the following components:

| Run No. | Resin | Expanding Agent |
| --- | --- | --- |
| 1 | PVC | methylene chloride and monofluorotrichloromethane |
| 2 | polyethylene | methylene chloride |
| 3 | polystyrene | methylene chloride and benzene |

In each case the final foam sheet produced had a residual expanding agent content of less than 10% by weight and a density ranging from about 0.03 to about 0.1 grams/cm³. All products were capable of being processed into foam article without causing collapse of the foam structure.

It will be understood from the foregoing examples that the term "tempering" as used herein refers to the heat treatment of the foamed resins required for effecting substantial removal of the expanding agent.

While the novel principles of the invention have been described, it will be understood that various omissions, modifications and changes in these principles may be made by one skilled in the art without departing from the spirit and scope of the invention.

What is claimed is:

1. A process for continuously producing an endless sheet product of a foamed thermoplastic synthetic resin comprising feeding a thermoplastic synthetic resin into an extruder, introducing at least about 35% based on the volume of the resultant admixture of a low-boiling volatile organic liquid expanding agent into the synthetic resin in said extruder under high pressure, said liquid expanding agent being capable of dissolving the thermoplastic resin at temperatures above 100°C and under pressures greater than one atmosphere, admixing the resin and expanding agent to provide a fluid admixture, heating said fluid admixture to a temperature substantially above the boiling point of the liquid expanding agent under normal pressure and subjecting the fluid admixture to high pressures, extruding the admixture through a die of the screw extruder having a plurality of small extrusion nozzles whereby the admixture suddenly expands and forms a plurality of filaments of synthetic resin foam, aligning the foam filaments exiting from the nozzles by an air stream, placing the foam filaments into an oscillating motion, loosely layering the oscillating foam filaments into a continuous web on a sieve-like conveyor belt traveling offset by about 90° with respect to the oscillating motion of the foam filaments, continuously pressing the thus-layered web of synthetic resin foam into a crude sheet between two sieve-like conveyor belts, tempering the crude sheet so formed by passing hot air therethrough whereby substantial removal of the expanding agent is effected, and thereafter forming said crude sheet into said endless sheet product.

2. The process of claim 1, wherein said expanding agent is a solvent for said thermoplastic synthetic resin at least in the vapor phase and said admixture is a solution.

3. The process of claim 1, wherein the fluid admixture is initially forced into said die by a screw conveyor, the admixture is divided into separate streams one for each of said nozzles, and each stream is pumped to a nozzle.

4. A process according to claim 1, wherein said crude sheet is formed into said endless sheet product by applying pressure to each side of said crude sheet while passing said crude sheet through a heating zone and a subsequent cooling zone.

5. A process according to claim 4, wherein the layered web of synthetic resin foam being continuously pressed into said crude sheet is simultaneously subjected to a preliminary tempering to remove a portion of the expanding agent therefrom, said preliminary tempering being accomplished by passing hot air through said crude sheet, and thereafter said crude sheet is subjected to a subsequent tempering to remove additional expanding agent therefrom, said subsequent tempering being accomplished by passing hot air therethrough.

6. A process according to claim 5, wherein the amount of expanding agent introduced into the synthetic resin in said extruder is about 35 to 45% based on the volume of the admixture.

7. A process according to claim 6, wherein said thermoplastic resin is hard polyvinyl chloride.

8. A process according to claim 1, wherein the foam filaments are pressed on said sieve-like conveyor belt by means of the air stream utilized for aligning the foam filaments exiting from the nozzles.

9. The process according to claim 1, wherein said endless sheet of synthetic foam is ¼ to ⅓ as thick as said crude sheet.

10. The process according to claim 5, wherein the preliminary tempering and subsequent tempering are accomplished at a temperature between about 95° to 100°C.

11. The process according to claim 5, wherein said crude sheet is heated to a temperature of about 115° to 120°C under a compressive stress of about 0.1 to 0.5 atmosphere gauge and thereafter cooled to about 40° to 50°C under a pressure of about 0.1 to about 0.5 atmosphere gauge to form said endless sheet product.

12. The process accorinding to claim 1, wherein tempering is accomplished at a temperature of about 95° to 100°C.

13. The process according to claim 1, wherein said thermoplastic synthetic resin is selected from the group consisting of polyvinyl chloride, polystyrene, polyethylene and polyurethane.

14. The process according to claim 13, wherein said low-boiling liquid expanding agent boils under atmospheric pressure below about 100°C.

15. The process according to claim 14, wherein said low-boiling liquid expanding agent is selected from the group consisting of acetone, methylene chloride, monofluorotrichloromethane, a mixture of methylene chloride with benzene, a mixture of methylene chloride with acetone, a mixture of acetone and water and a mixture of acetone and ethyl acetate.

16. The process according to claim 13, wherein said resin is polyvinyl chloride and said liquid low-boiling expanding agent is acetone, methylene chloride, or a mixture of acetone and water.

17. The process according to claim 13, wherein said resin is polystyrene and said low-boiling liquid expanding agent is methylene chloride, a mixture of methylene chloride and benzene or a mixture of methylene chloride and acetone.

18. The process according to claim 13, wherein said resin is cellulose acetate, and further wherein said low-boiling liquid expanding agent is acetone or a mixture of acetone and ethyl acetate.

19. The process according to claim 14, wherein said thermoplastic resin and said low-boiling liquid expanding agent are combined under a pressure of about 20 to about 50 atmospheres gauge at a temperature of about 150° to about 300°C.

20. The process according to claim 19, wherein said thermoplastic resin and said low-boiling liquid expanding agent are combined at a temperature of about 150° to 200°C.

21. The process according to claim 1, wherein about 35 to about 45% based on the volume of the admixture of said low-boiling liquid expanding agent is combined with said thermoplastic resin.

22. The process according to claim 14, wherein the conveying efficiency of the screw in said screw extruder is such that foaming of the admixture of said thermoplastic resin and said low-boiling liquid expanding agent in the extruder die or the extruder screw barrel is prevented.

23. The process according to claim 22, wherein the conveying efficiency of the extruder screw is such that foaming of the extrudate is terminated approximately 30 to 40 mm behind the outlet of each nozzle.

24. A process for the continuous production of an endless sheet product from a foamed thermoplastic synthetic resin comprising feeding a thermoplastic synthetic resin into a screw extruder, introducing at least about 35% based on the volume of the resultant admixture of a low-boiling volatile organic liquid expanding agent into the synthetic resin in said extruder under high pressure, said liquid expanding agent being capable of dissolving the thermoplastic resin at temperatures above 100°C and under pressures greater than one atmosphere, admixing the resin and expanding agent to provide a fluid admixture, heating the admixture of resin and expanding agent to a temperature substantially above the boiling point of the liquid expanding agent under normal pressure and subjecting the fluid admixture to high pressures, extruding the admixture through a die of the screw extruder having a plurality of small extrusion nozzles in such a way that the admixture expands after leaving the extruder into a plurality of filaments of synthetic resin foam, aligning the foam filaments exiting from the nozzles of said die by an air stream, loosely layering the foam filaments on a sieve-like moving conveyor belt to form a continuous web, the foam filaments being layered in a direction offset with respect to the motion direction of the conveyor belt, and forming the thus-layered web of synthetic resin foam into said endless sheet while continuously removing expanding agent therefrom.

25. A process according to claim 24, wherein the layered web of synthetic resin foam is preliminarily pressed into a crude sheet and simultaneously subjected to preliminary tempering by blowing hot air therethrough for removing a portion of the expanding agent therein, said crude sheet thereafter being subjected to a second tempering by blowing hot air therethrough for effecting substantial removal of the expanding agent therein.

26. A process according to claim 25, wherein the crude sheet is formed into said endless sheet product by heating said crude sheet to a temperature of about 115° to 120°C under a compressive stress of about 0.1 to 0.5 atmospheres gauge and thereafter cooling to about 40° to 50°C under a pressure of about 0.1 to 0.5 atmospheres gauge.

27. A process according to claim 26, wherein said thermoplastic resin is hard polyvinyl chloride, and wherein the amount of liquid expanding agent is about 35 to 45% based on the volume of said admixture.

* * * * *